Figures 1, 2:
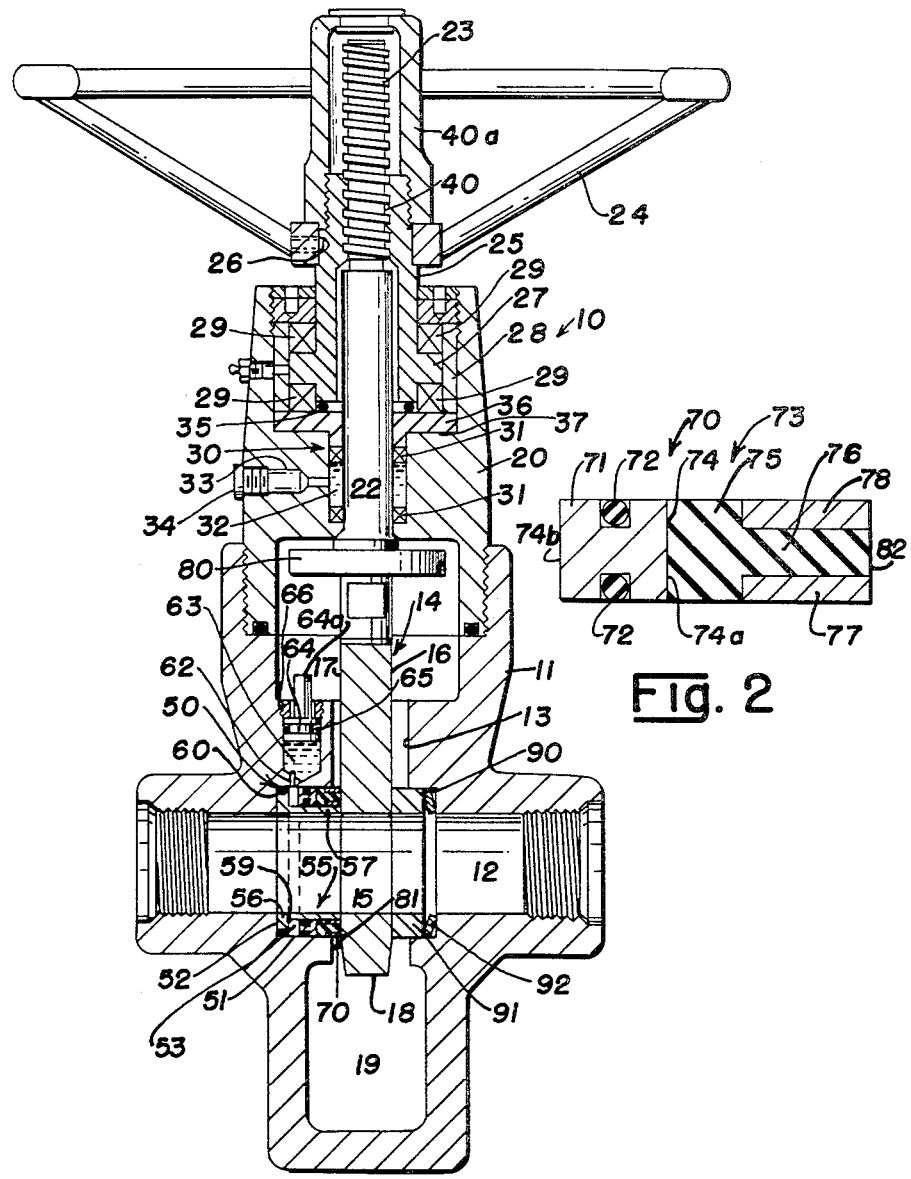

Oct. 15, 1968     T. J. BOLLING, JR     3,405,911

SEAL ARRANGEMENT FOR GATE VALVE

Filed Oct. 14, 1966

THOMAS J. BOLLING, JR.
INVENTOR.

BY *Hayden & Pravel*

ATTORNEYS

United States Patent Office 3,405,911
Patented Oct. 15, 1968

3,405,911
SEAL ARRANGEMENT FOR GATE VALVE
Thomas J. Bolling, Jr., 5310 Glenmont,
Houston, Tex. 77036
Filed Oct. 14, 1966, Ser. No. 586,755
2 Claims. (Cl. 251—172)

The present invention relates to a sealing arrangement for a gate valve.

The present invention relates to an improvement in a seal arrangement for use with gate valves as disclosed and claimed in my copending application Ser. No. 479,035 filed on Aug. 2, 1965, for "Closed Fluid System for Sealing Valve Closure Elements," now United States Letters Patent No. 3,321,176.

In gate valves presently in use in industry, a gate element moves through a lateral bore to close off a transverse bore through which fluid is moving. The above-identified application for patent discloses and claims an arrangement for sealing the closure element to inhibit leakage of the fluid in the transverse bore around the gate element when it is in closed position. As the gate element moves towards closed position and as it is removed from closed position, there is some contact between the resilient sealing member that sealingly engages against the element and this increases the tendency to damage the resilient element as the edges of the gate element move across the face of the sealing element.

The present invention is directed to a construction to aid in overcoming this problem and provides a sealing arrangement which is effective yet one which also protects the resilient sealing member from damage by the edges of the gate element as it moves thereacross towards and away from closed position into open position.

A primary object of the present invention is to provide a seal arrangement for gate valves operable by a closed fluid pressure system, which seal means is integrally formed and provided with metal protectors on each side thereof to inhibit cutting of the resilient sealing element by the gate element as it moves past the resilient sealing portion of the sealing means.

Other objects and advantages of the present invention will become more readily apparent from a consideration of the following description and drawings wherein:

FIG. 1 is a sectional view, partly in elevation, showing the sealing arrangement of the present invention in a gate valve; and FIG. 2 is an enlarged sectional view illustrating in greater detail the integrally formed sealing arrangement of the present invention.

Attention is first directed to FIG. 1 of the drawings wherein a valve is represented generally by the numeral 10 and is shown as including the body 11 which is provided with a transverse bore 12 extending therethrough for conducting fluids through the valve. A lateral bore 13 is provided in the valve body 11 for receiving the gate element referred to generally by the numeral 14.

The gate element 14 is a flat plate having the opening 15 therein so that when the gate element is in the position shown in FIG. 1, the opening 15 is aligned with the transverse bore 12 for fluid flow through the valve. The gate element 14 also is provided with the flat sides 16 and 17, and when the gate element 14 is moved to its lowermost position within the valve body, the lower end 18 of the element 14 is received within the recess 19 formed at the bottom of the valve body 11 and the flat surfaces 16 and 17 intersect the transverse bore 12 to close it off.

A bonnet 20 is threadedly secured to the body 11 as shown in FIG. 1 of the drawings, and the gate element 14 is connected with a stem 22 by any suitable means such as by way of example, the lost motion arrangement described and claimed in application Ser. No. 479,035, now United States Patent No. 3,321,176, hereinbefore referred to. On the other hand, the stem 42 may be rigidly connected with the gate element 14 if desired.

The upper end of the stem 22 is threaded as shown at 23, and by rotation of the hand wheel 24, the stem 22 may be moved upwardly or downwardly relative to the valve body 11 to open and close the valve. The hand wheel 24 is secured to the cylindrical member 25 by any suitable means such as the pin 26, the cylindrical member 25 including the annular shoulder 27 which is carried within the recess 28 formed in the upper end of bonnet 20, there being suitable bearing means as illustrated at 29 for supporting and engaging each side of the annular flange 28. To inhibit leakage from the valve body 11 and bonnet 20, suitable seal means are provided around the stem as illustrated generally at 30 and may be of any suitable form including the spaced annular packing 31 having a viscous liquid disposed therebetween as illustrated at 32. A passage 33 is formed within the bonnet 20 and is closed off by the cap 34 for providing additional liquid between the seals 30 and 31, if necessary.

Additionally, the seal ring 35 is provided between the lower end of the member 25, and the support 36 which rests on the shoulder 37 formed at the lower end of the recess 28 to further aid in inhibiting leakage of fluid from the valve 11.

When the hand wheel 24 is rotated, the member 25 is also rotated, and it will be noted that its upper end is threadedly engaged as illustrated at 40 with the threads 23 formed on the upper end of the stem 22, thereby enabling the stem 22 and gate element 14 to be moved upwardly and downwardly within the valve body to either open or close the transverse bore 12 as desired. A cap 40a is threadedly connected to cylindrical member 25 at its upper end to cover the upper threaded end of stem 22.

Adjacent the transverse bore 12 on one side of the gate element 14 there is an enlargement referred to generally by the numeral 50, which enlargement encircles the transverse bore and is formed by the cylindrical wall 51 which extends from the lateral bore 13 and parallel to the transverse bore as illustrated in the drawings so that the annular surface 51 surrounds but is spaced from the transverse bore 12 in the valve body. The termination of the enlargement 50 forms an end wall 52 which extends laterally of and intersects the transverse bore 12 as shown in FIG. 1 of the drawings.

Fitted within the enlargement 50 is a cylindrical element referred to generally by the numeral 55 which is provided with an end portion 56 that abuts and conforms with the end wall 52 and is in the form of an annular ring, the width of which conforms with the depth of the end wall 52 so that the circumferential edge of the end portion 56 and the outer wall of cylindrical extension 57 formed integrally therewith and which extends from the end portion, is of the same internal diameter as the bore 12 of the valve body 11. It will be noted that the extension 57 extends toward the lateral bore 13 and terminates therein as shown in FIG. 1 of the drawings.

The cylindrical extension 57 is narrower in width than the enlargement 50 to form a ring-shaped opening referred to by the numeral 53 in FIG. 1 of the drawings. The ring-shaped opening extends between the inner wall of the cylindrical extension 57 and the annular surface 51 of the enlargement and extends longitudinally of the transverse bore from the surface 59 of the end portion 56 to the termination of the cylindrical extension 57 within the lateral bore 13.

The end portion 56 is provided with seal means 60 which seal off between the annular surface 51 and the circumferential edge of the end portion 56 to inhibit fluid leakage therebetween.

Fluid passage means 62 are formed within the valve body 11 which communicate with the enlargement 53 as shown in FIG. 1 of the drawings. One end of the fluid passage means 62 is enlarged as shown at 63 to provide a liquid reservoir for liquid therein, thereby forming a liquid reservoir within the valve body 11. The enlarged portion 63 of the passage 62 is closed off by the piston 64 which is provided with suitable seal means 65 and is held in position by the threaded nut 66 within the enlargement, thereby forming a closed fluid receiving and retaining means within the valve body 11 of the present invention.

A ring-shaped member referred to generally by the numeral 70 is disposed within the ring-shaped opening 53 and is constructed and arranged for sealingly engaging the gate element 14 when it is in closed position. The ring-shaped member 70 includes at one end a metal ring 71 of suitable dimension to fit within the ring-shaped opening 53 between the inner wall of the cylindrical extension 57 and the annular surface 51 of enlargement 50 as shown in FIG. 1 of the drawings. Seal means 72 are provided in the ring-shaped member 71 for sealing with the annular surface 51 of the ring-shaped opening and with the inner wall of the cylindrical extension 57 to inhibit fluid leakage thereby.

A resilient sealing member referred to generally by the numeral 73 is bonded to one annular edge 74 of the metal ring 71 as more clearly shown in FIG. 2 of the drawings, and in cross-section the resilient member 73 is T-shaped with the top of the T as illustrated at 74a being bonded to the annular edge 74 as previously mentioned. The base of the T is designated by the numeral 76, and it will be noted that it is reduced in thickness in cross-sectional dimension relative to the thickness of top 75 of the T-shaped resilient ring member to provide annular recesses for receiving the annular metal rings 77 and 78 which are bonded to each side of the base of the T as shown more clearly in FIG. 2 of the drawings.

The resulting construction of the ring-shaped member 70 is that it is of uniform thickness throughout its extent and thereby fits within the ring-shaped opening 53 formed in the valve body 11 in the manner as previously described.

Suitable means 80 are provided on the valve stem 22 for engaging the extension 64a integrally formed on the piston 64, thereby forcing liquid through the passage 62 and into the enlargement between surface 59 of the end portion 56 of the cylindrical element and the other annular edge 74b of the ring-shaped member 70 to thereby force the ringshaped member 70 longitudinally outwardly toward the gate element as it moves towards closed position.

The lower edge 81 of the gate element 14 as well as the edge of the opening 15 move across the end 82 of the T-shaped resilient sealing element 73, and heretofore some difficulty has been experieneced in that as these edges move across the bottom 82 of a resilient sealing element in a gate valve construction, such resilient element at its end is cut or damaged, thereby reducing its effectiveness as a seal.

Also, when the liquid is forced against the ring-shaped member, the resilient sealing element 73 has a tendency to "cold flow" and thereby force the end or bottom 82 of the resilient portion thereof into sealing engagement with the gate 14.

The extrusion or "cold flowing" of the rubber increases the tendency of the cutting previously referred to, and in an endeavor to overcome this problem, the metal seal rings 78 and 77 are provided so that the edge 81 of the gate element 14 first contacts the upper ring 78, thereby tending to protect the end 82 of the resilient sealing member 73 as the gate element is moved to closed position. Similarly, the ring 77 will inhibit cutting or damage of the end 82 as the edges of the opening 15 within the gate element move thereby or as the gate element is moved to closed position.

When the gate element is moved upwardly within the valve body, the rings 77 and 78 will again aid in protecting the end 82 of the resilient sealing member to inhibit cutting or damage thereto by the edges of the gate element. This increases the effectiveness of the seal as well as increasing its period of use.

If desired, an enlargement 90 may be provided on the other side of the gate element 14 as shown in FIG. 1 of the drawings for receiving a metal ring 91 therein which is urged outwardly by the Bellville spring 92 as shown in FIG. 1 of the drawings. The ring 91 has an opening therethrough which is of the same diameter as the transverse bore 12 and the spring 92 and ring 91 urge the gate element 14 towards the ring-shaped member 70 to aid in properly positioning the gate element relative to such member for sealing engagement therewith.

Broadly, the present invention relates to a sealing arrangement for gate valves, and more particularly, to a ring-shaped member which is hydraulically actuated and provided with means for protecting a resilient seal element integrally formed with such member.

What is claimed is:

1. In a valve including a body having a transverse bore for fluid flow therethrough and having a lateral bore for receiving a gate element for closing and opening the transverse bore to fluid flow and a movable valve stem extending into the body and connected to the element for opening and closing the transverse bore to fluid flow on relative movement of the element in the lateral bore, the improvement comprising:

(a) there being an enlargement in the body encircling the transverse bore and being formed by a cylindrical wall extending from the lateral bore longitudinally along the transverse bore and defining an annular surface surrounding but spaced from the transverse bore and at its termination forming an end wall extending laterally of and intersecting the transverse bore;

(b) a cylindrical element having an end portion which abuts the end wall of the enlargement and a cylindrical extension which extends from the portion that abuts the end wall toward the lateral bore and terminating therein;

(c) said cylindrical extension throughout its extent being of substantially the same internal diameter as the transverse bore and being narrower in width than the enlargement to form a ring-shaped opening surrounding but spaced from the transverse bore, such ring-shaped opening extending between said cylindrical extension and the annular surface of the enlargement and between said end portion of said cylindrical element and the lateral bore;

(d) seal means between said end portion of said cylindrical element and the annular surface of the enlargement to inhibit fluid leakage therebetween;

(e) a ring-shaped member disposed within the ring-shaped opening for engaging the gate element when in closed position to sealingly engage therewith;

(f) said ring-shaped member including at one end a metal ring to fit within the ring-shaped enlargement;

(g) seal means in said ring-shaped member for sealing with the annular surface of the enlargement and for sealing with said cylindrical extension of said cylindrical element;

(h) a resilient sealing member bonded to one end of said metal ring and in cross-section being substantially T-shaped with the top of the T being bonded to one end of the metal ring;

(i) metal rings bonded on each side of the base of the T of the resilient sealing member so that said ring-shaped member is of substantially uniform thickness throughout its length;

(j) there being fluid passage means formed in the valve body and communicating with the enlargement between the end portion of said cylindrical element and the other end of said metal ring;

(k) piston means received in one end of the fluid passage means to close off same and form a closed fluid receiving and retaining system, said system receiving and retaining fluid for urging said ring-shaped member longitudinally of the enlargement;

(l) means carried on the stem for moving said piston means against the fluid to urge said ring-shaped member toward the gate element when it moves toward closed position;

(m) the end of said T-shaped resilient sealing member engaging said gate element and sealing thereagainst when the gate element is in closed position; and (n) said metal rings on each side of the base of the T-shaped resilient sealing member inhibiting damage to said resilient sealing member when said gate element moves across the end thereof when it moves to closed position and when it moves to open position.

2. The invention of claim 1 including an annular metal ring positioned on the opposite side of the gate element and surrounding the transverse bore, and resilient means normally urging said metal ring against the gate element to aid in moving it toward the end of the T-shaped resilient sealing member thereby positioning the gate element for sealing contact with the end of the base of the T of the resilient sealing member when the gate element is in closed position.

References Cited

UNITED STATES PATENTS

| | | | |
|---|---|---|---|
| 783,953 | 2/1905 | Henry | 251—172 |
| 2,726,842 | 12/1955 | Seamark | 251—172 |
| 3,135,285 | 6/1964 | Volpin | 251—172 XR |

ALAN COHAN, *Primary Examiner.*

H. W. WEAKLEY, *Assistant Examiner.*